(12) United States Patent
McBride et al.

(10) Patent No.: US 9,830,458 B2
(45) Date of Patent: Nov. 28, 2017

(54) DISCOVERY AND CLASSIFICATION OF ENTERPRISE ASSETS VIA HOST CHARACTERISTICS

(71) Applicant: SYMANTEC Corporation, Mountain View, CA (US)

(72) Inventors: Kevin McBride, Silver Spring, MD (US); Quentin Liu, San Jose, CA (US); Hari Veladanda, Pleasanton, CA (US); George Tomic, Morgan Hill, CA (US); Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 21 days.

(21) Appl. No.: 14/262,349

(22) Filed: Apr. 25, 2014

(65) Prior Publication Data

US 2015/0310215 A1 Oct. 29, 2015

(51) Int. Cl.
G06F 11/00 (2006.01)
G06F 21/57 (2013.01)
G06Q 10/06 (2012.01)

(52) U.S. Cl.
CPC ........... *G06F 21/577* (2013.01); *G06Q 10/06* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,219,239 B1* | 5/2007 | Njemanze | H04L 63/0218 726/21 |
| 7,395,244 B1* | 7/2008 | Kingsford | G06Q 10/06 705/52 |
| 8,341,717 B1* | 12/2012 | Delker | H04L 63/20 705/56 |
| 9,350,601 B2* | 5/2016 | Jain | H04L 41/0654 |
| 2003/0182573 A1* | 9/2003 | Toneguzzo | G06F 17/30867 713/176 |
| 2005/0076200 A1* | 4/2005 | Thornton | H04L 63/0823 713/156 |
| 2006/0031938 A1* | 2/2006 | Choi | G06F 21/552 726/25 |
| 2006/0212931 A1* | 9/2006 | Shull | G06F 21/55 726/10 |
| 2007/0101433 A1* | 5/2007 | Louch | G06F 21/552 726/25 |
| 2007/0192236 A1* | 8/2007 | Futch | G06Q 40/025 705/38 |
| 2008/0016569 A1* | 1/2008 | Hammer | G06F 21/554 726/23 |
| 2010/0162392 A1* | 6/2010 | Jeong | H04W 12/12 726/22 |

(Continued)

*Primary Examiner* — Trang Doan
(74) *Attorney, Agent, or Firm* — Patterson + Sheridan, LLP

(57) ABSTRACT

Techniques are presented herein for classifying a variety of enterprise computing resources based on asset characteristics. In particular, a computing asset, e.g., a server, may be classified based on any digital certificates provisioned on that server. That is, the properties of a digital certificate may be used to determine a measure of business value or importance of a server (or data hosted on that server). Once the computing asset has been classified, a monitoring system may use the assigned classifications to prioritize security incidents for review.

14 Claims, 7 Drawing Sheets

(56) References Cited

U.S. PATENT DOCUMENTS

| | | | | |
|---|---|---|---|---|
| 2011/0055925 A1* | 3/2011 | Jakobsson | ............. | G06F 21/552 726/25 |
| 2012/0264394 A1* | 10/2012 | Miller | .................... | G06Q 10/06 455/404.1 |
| 2013/0055385 A1* | 2/2013 | Antony | ................ | G06F 21/577 726/22 |
| 2013/0074188 A1* | 3/2013 | Giakouminakis | ....... | G06F 21/57 726/25 |
| 2013/0104236 A1* | 4/2013 | Ray | .................... | H04L 63/1408 726/25 |
| 2013/0111592 A1* | 5/2013 | Zhu | ....................... | G06F 21/577 726/25 |
| 2013/0174259 A1* | 7/2013 | Pearcy | ................ | H04L 41/0893 726/25 |
| 2013/0318604 A1* | 11/2013 | Coates | ............... | H04L 63/1416 726/22 |
| 2014/0075502 A1* | 3/2014 | Aissi | ....................... | G06F 21/60 726/1 |
| 2014/0237582 A1* | 8/2014 | Niemela | ............ | H04L 63/0823 726/10 |
| 2014/0283049 A1* | 9/2014 | Shnowske | .......... | H04L 63/1441 726/23 |
| 2014/0344937 A1* | 11/2014 | Sabin | .................. | H04L 63/1433 726/25 |
| 2015/0205954 A1* | 7/2015 | Jou | ....................... | G06F 21/316 726/22 |
| 2015/0302425 A1* | 10/2015 | Borger | ............... | G06Q 30/0201 705/7.29 |

* cited by examiner

MONITORING SYSTEM

Security Incident Report — 605

| Priority | Event | Server IP Address | Classification 610 |
|---|---|---|---|
| 1 | Port scan | Server 206.204.52.31 | Externally facing server |
| 2 | Intrusion attempt (XSS) | Server 206.204.52.31 | Externally facing server |
| 2 | AV event | Server 10.0.0.15 | High privacy endpoint |
| 3 | Attempted external connection | Server 10.0.0.15 | High privacy endpoint |
| 4 | Malformed query | Server 216.12.145.20 | Production Database server |
| 5 | Connection to known malware distribution address | Server 10.0.0.100 | Internal development host |
| 5 | AV event | Server 10.0.0.105 | Internal application server |
| 6 | Remote connection attempted | Server 10.0.0.5 | High redundancy internal server |
| 7 | Remote connection attempted | Server 10.0.0.5 | High redundancy internal server |
| 8 | Root kit detected | Server 10.0.0.100 | Internal development host |

< Prev 1 2 3 4 5 Next >

FIGURE 6

DISCOVERY AND CLASSIFICATION OF ENTERPRISE ASSETS VIA HOST CHARACTERISTICS

BACKGROUND

Field

Embodiments of the invention generally relate to techniques for managing security incidents logged by a variety of security monitoring tools. More specifically, embodiments presented herein provide techniques for classifying enterprise assets based on a security configuration and any digital certificates installed on a given asset.

Description of the Related Art

Enterprise computing systems, applications, networks, and data face a variety of security threats and vulnerabilities. As a result, security tools are used to monitor an enterprise's computing systems and infrastructure. This can result in a large number of security incidents that enterprise personnel need to review.

Given limited resources, an enterprise wants to remediate security incidents that will have most impact if left unattended. One approach for doing so is to classify servers or other computing assets relative to how important they are to the organization. For example, an enterprise needs to classify assets, such as server computing systems hosting enterprise applications, in order to triage security incidents, validate appropriate security controls exist, simulate threat modeling and perform other security related functions. Classifying assets in terms of function and criticality can help an enterprise identify security incidents that should be prioritized for remediation. For instance, public website servers (and backend systems storing customer data) are typically of much higher value than internal resources like a mail server or development lab server. However, enterprises often lack the resources to triage, process, and remediate large numbers of security incidents in a timely manner.

Enterprises typically create asset classifications manually, if at all. Manually assigning computing servers and data storage systems to asset categories is tedious, unlikely to get prioritization from busy users, and is unlikely to be maintained. Thus, security incidents that impact key enterprise resources are frequently not prioritized, which can lead to more reputation injury, financial losses, and legal impacts.

SUMMARY

One embodiment presented herein includes a method for managing a plurality of computing assets. This method may generally include, for one or more of the computing assets, identifying, by operation of at least one computer processor, one or more attributes associated with a digital certificate installed on the computing asset and assigning a classification to the computing asset based on the attributes of the identified digital certificate. The classification is used to prioritize security incidents occurring on the plurality of computing assets.

In a particular embodiment, the method may also include identifying one or more configuration attributes of one of the computing assets. In such a case, the classification assigned to that computing asset may further be based on the configuration attributes. For example, the configuration attributes may include a network configuration of the computing asset. The attributes associated with the digital certificate may include at least one of a key size, a supported encryption algorithm, an issuing certificate authority, and use flags specified in the digital certificate. In one embodiment, the method may still further include identifying a set of security incidents that have occurred on the one or more computing assets and ranking the set of security incidents based on the assigned classifications.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 6 illustrates an example report which prioritizes security incidents based on asset classifications, according to one embodiment.

DETAILED DESCRIPTION

Figure 1:
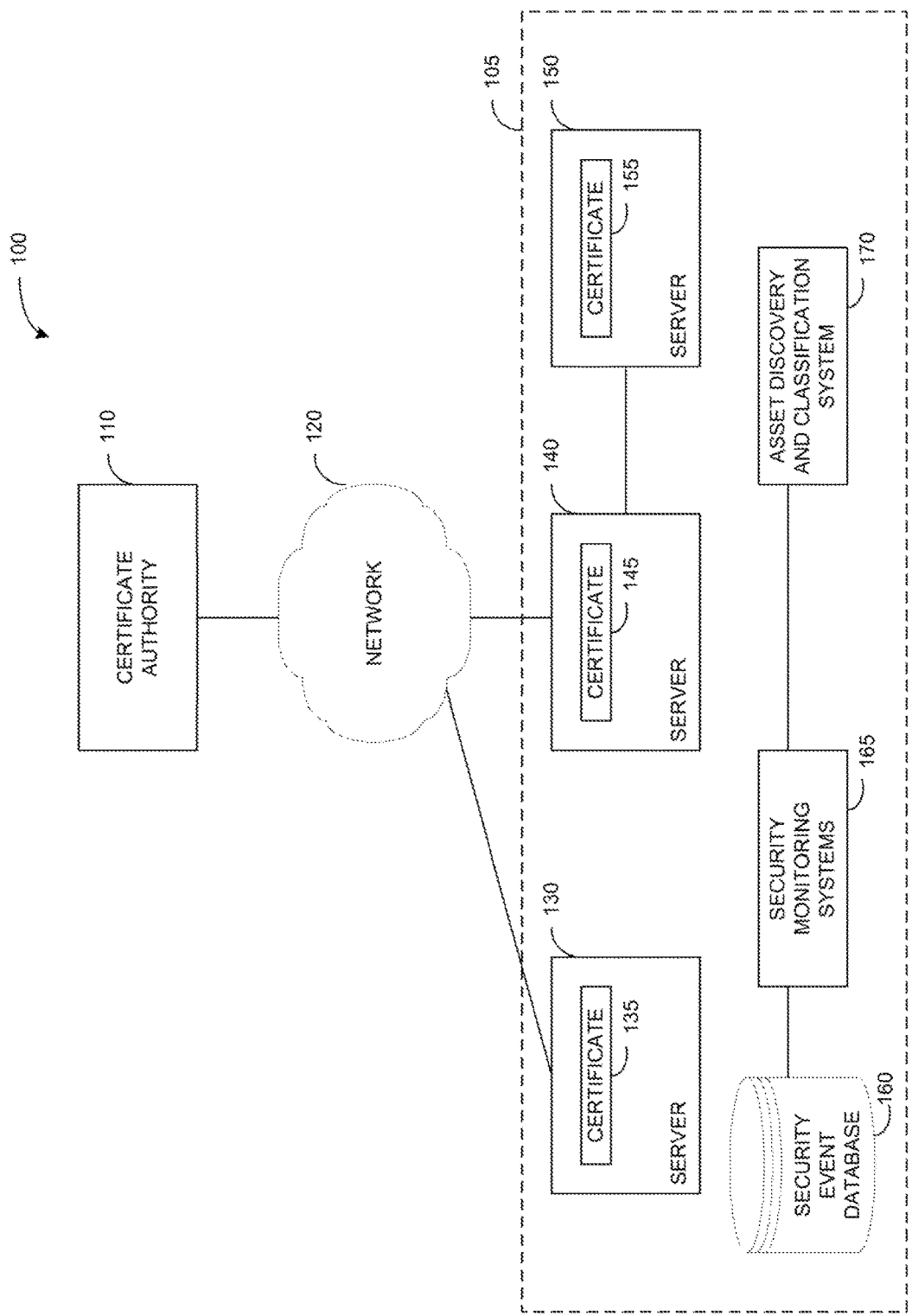
FIG. 1 illustrates an example computing environment used to discover and classify enterprise assets via host characteristics, according to one embodiment.

Embodiments presented herein provide techniques for identifying and classifying a variety of enterprise computing resources based on host application characteristics. For example, embodiments may assign a classification to a server, application, network device, appliance, storage device, etc. (referred to generally as an "asset"), based on a digital certificate provisioned on that device. Once assets have been classified, a security system may prioritize security incidents for review based on the assigned classifications. More generally, embodiments presented herein automatically determine and maintain security classifications based on certain properties of the underlying assets.

In one embodiment, an asset may be classified by inspecting digital certificates provisioned on the asset (and on other properties). Security certificates are a common part of an enterprise security infrastructure and provide insights into the business value of a server on which they are installed. Digital certificates have different properties (e.g., key-size, use-flags, certificate polices, encryption algorithms, etc.). The properties of a digital certificate may be used to determine a measure of business value or importance of a server (or data hosted on that server). Certificates with more advanced cipher algorithms and higher costs generally indicate a stronger need to protect that asset. Using digital certificates to help determine asset value allows an enterprise to prioritize security incidents without the need for manual asset classification.

For example, lack of a digital certificate indicates that a resource has minimal security controls. Similarly, certificates signed from an internal enterprise certificate authority indicate more control but a minimal investment. Certificates with more advanced cipher algorithms denote requirements for higher levels of security. Certificates from third party certificate authorities cost money and may indicate that an asset is a publicly facing resource or stores sensitive information for the enterprise. In one embodiment, an association between a digital certificate and an asset can be discovered by examining certificates installed on hosts or via certificate associations in a third party system (e.g., a corporate LDAP directory). Furthermore, certificate characteristics which have no inherent security meaning can be used to create subgroups of assets. For instance, all certificates for a high security environment may share a common property such as "PCI-payment-server" in the host name.

In addition to the presence, absence, and type of digital certificate used to secure an asset, a variety of other system characteristics and configuration attributes can also be examined that can lead to classification of an asset as high value. For example, a classification may take into account whether a static IP address is assigned to a server or whether the IP address is an externally routable. The classification system can also evaluate software and hardware configurations, such as whether a server has multiple network interfaces, the operating system, server software, or applications installed on the system. Similarly, scaled host configurations (DNS round robin, load balancing IP addresses), the presence of server security software or hardening (host intrusion detection), and the presence of specific application software, can each indicate that a server should be assigned a high priority for incident review.

Note, embodiments of the invention are described below using a computer server hosting one or more applications as an asset that may be secured using a digital certificate. One of ordinary skill in the art will recognize that embodiments of the invention may be adapted to work with a variety of computing devices used to communicate, process, or store sensitive data or which can be provisioned with a digital certificate. For example, embodiments may be used with virtualized systems and infrastructure, stand-alone computing appliances, network devices, data storage devices, etc., which use digital certificates as a security mechanism.

FIG. 1 illustrates an example computing environment 100 used to discover and classify enterprise assets via host characteristics, according to one embodiment. As shown, the computing environment 100 includes a certificate authority 110 and an enterprise computing environment 105, both connected to a network 120 (e.g. the internet). Additionally, the enterprise computing environment 105 includes three server systems 130, 140, and 150. The enterprise computing environment 105 also includes a security event database 160, security monitoring systems 165, and an asset discovery and classification system 170.

In this example, server systems 130, 140, and 150 have each been provisioned with a digital certificate 135, 145, and 155, respectively. As known, a digital certificate is used to bind a public key named in the certificate to an identity. For example, a certificate used to secure a web server may bind a public key to a domain name. The certificates may be issued by a certificate authority managed by enterprise computing environment 105 (not shown) or by a third party certificate authority 110. Certificate authority 110 may issue digital certificates with different properties, such as key-size, encryption algorithms, use flags, as well as issue certificates based on the level of investigation performed by the certificate authority 110, the intended use of a digital certificate, the security used to safeguard the certificated (or associated private key).

In this example, assume servers 130 and 140 are public facing systems with routable network addresses and that certificates 135 and 145 secure communications over the network 120 with servers 130 and 140. Further, assume server 150 is not configured with a public facing network address, but instead provides a database used to store customer data received by server 140. In such a case, server 150 may use certificate 155 (and an associated private key) to encrypt customer data stored in the database as well as secure communications between server 140 and server 150.

Within enterprise computing environment 105, the security monitoring systems 165 may be configured to monitor servers 130, 140, and 150 for security incidents. Monitoring systems 165 may include any combination of firewalls, antivirus tools, intrusion protection, network monitoring, packet inspection systems, or other computing applications or hardware systems used to detect the occurrence of activity related to any attempt to attack, compromise, or otherwise disrupt the operation of servers 130, 140, and 150. While monitoring servers 130, 140, and 150, monitoring systems 165 may record any security incidents in security event database 160. That is, security event database 160 records a log of all security incidents observed by the monitoring systems 165. Given the large number of security incidents that occur in an even moderately sized enterprise computing system, the monitoring systems 165 may prioritize incidents for review by a system administrator.

In one embodiment, the monitoring systems 165 may prioritize security incidents recorded in the event database 160 based on a classification assigned to the server for which the incident was recorded. Further, the classifications assigned to servers 130, 140, and 150 may be determined by the asset discovery and classification system 170. In one embodiment, the asset discovery and classification system 170 may inspect the digital certificates 135, 145, and 155 (and associated properties) to determine a security classification for servers 130, 140, and 150. In addition to inspecting digital certificates 135, 145, and 155, the asset discovery and classification system 170 may also evaluate other relevant configuration settings for servers 130, 140, and 150 to assign a classification. For example, the asset discovery and classification system 170 may identify server 130 as being a non-public facing system provisioned with a certificate issued by an enterprise certificate authority. The asset discovery and classification system 170 may identify server 140 as a public facing system configured with a certificate issued by certificate authority 110. Similarly, the asset discovery and classification system 170 may evaluate server 150 and determine that certificate 155 is used to secure data in a non-public facing system accessed by server 140. In response, the asset discovery and classification system 170 could assign classification to servers 140 and 150 that prioritize security incidents on these servers over security incidents on server 130. Of course, the actual classifications and criteria used to make the classifications may be tailored to suit the needs of a particular enterprise.

Figure 2:
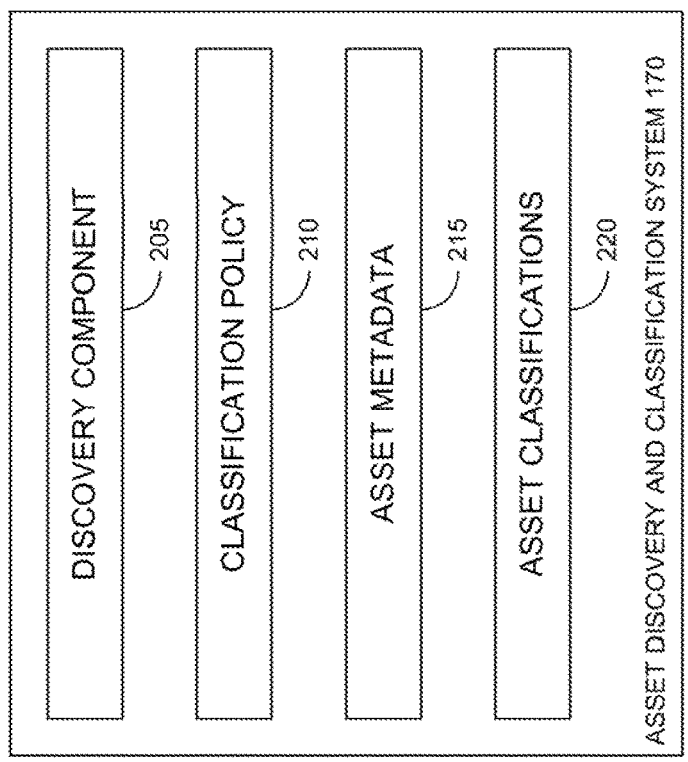
FIG. 2 illustrates components for an example asset discovery and classification system, according to one embodiment.

FIG. 2 illustrates components for an example asset discovery and classification system 170, according to one embodiment. As shown, the asset disvery and classification system 170 includes a discovery component 205, a classification policy 210, asset metadata 215, and asset classifications 220. In one embodiment, the discovery component 205 provides one or more applications used to scan and evaluate assets (e.g., servers) within an enterprise computing infrastructure. To do so, the discovery component 205 may be provided with a list of network addresses (or ranges), hostnames, or access to a directory service (e.g., an LDAP server within an enterprise network). Additionally, the discovery component 205 may probe systems within an enterprise network to obtain information related to a digital certificate. For example, discovery component 205 could attempt to establish a secure network connection to each host in an enterprise network. If successful, the server would present a digital certificate as part of obtaining the secure connection.

However the information is obtained, the discovery component 205 may store the information related to each enterprise server as asset metadata 215. In turn, the asset discovery and classification system 170 may use the asset metadata 215 to classify each server in an enterprise network based on the classification policy 210. While the specific classifications may be tailored as a matter of preference, the classification policy 210 is used to determine what servers within an enterprise network should be classified as high (or low) priority based on the digital certificates (and other metadata) provisioned on such servers for the reporting of security incidents. More generally, asset classification can provide a generalized measure of asset criticality. For example, the discovery component 205 could assign a number from 1 to N used to prioritize security incidents. In addition to being determined based on the presence and type of digital certificates, the numerical measure could be determined using a variety of discoverable asset characteristics (the digital certificate being one) evaluated to assign the measure classification of asset criticality.

Figure 3:
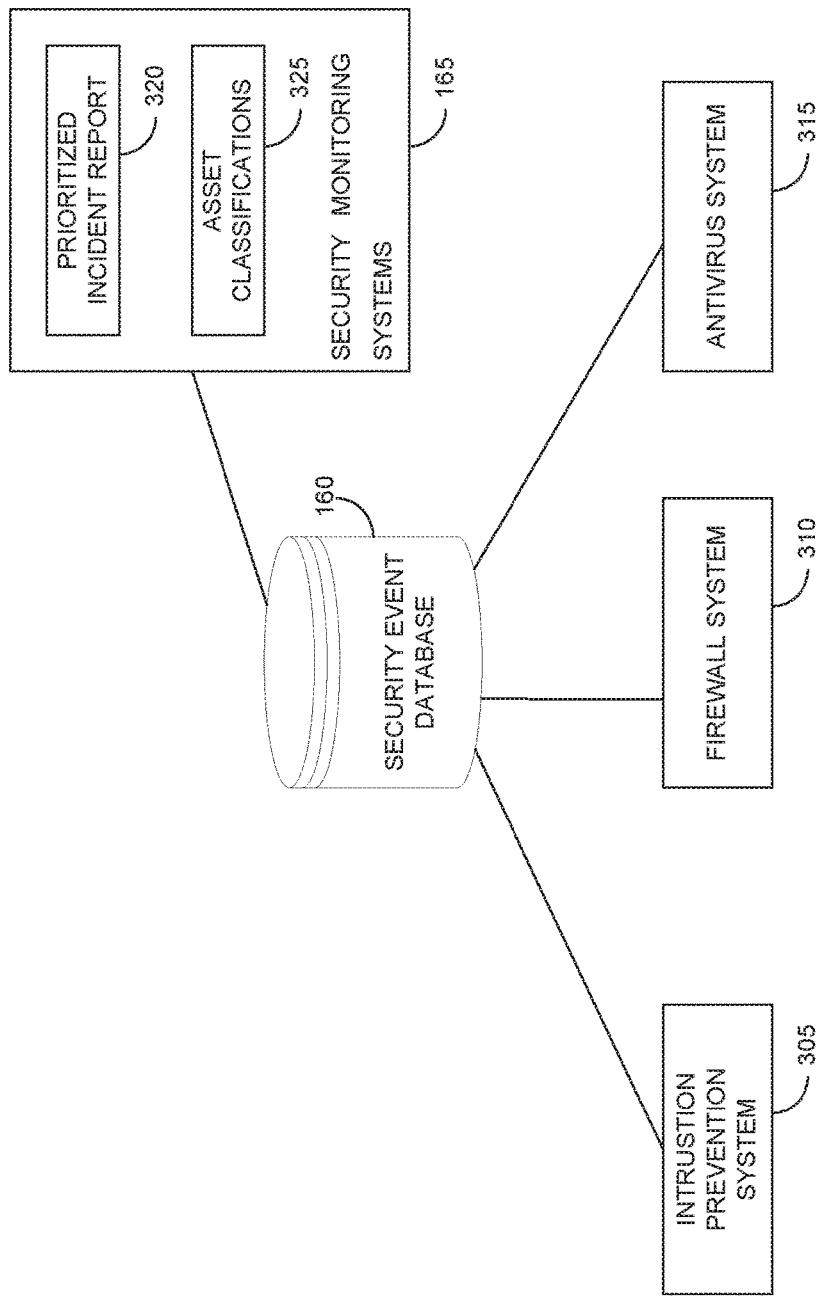
FIG. 3 illustrates components of a security monitoring component configured to prioritize security incidents based on asset classification, according to one embodiment.

FIG. 3 illustrates components of security monitoring systems 165 configured to prioritize security incidents based on asset classification, according to one embodiment. As shown, the security monitoring systems 165 access data recorded in the security event database 160 by an intrusion prevention system 305, a firewall system 310, and an antivirus system 315.

In one embodiment, the security monitoring systems 165 generate a prioritized incident report 320 listing security incidents recorded in the security event database 160. Further, the incident report may rank or order entries in the report based on asset classifications 325. In one embodiment, a high-priority classification may result in security incidents recorded by systems 305, 310, and 315, being prioritized for review in prioritized incident report 320. However the prioritization may be more fine-grained. For example, referring again to FIG. 1, some security incidents recorded for the public facing server system 140 may be relatively routine (e.g., a port scan received over network 120). In such a case, even though server 140 is classified as a high-priority system (as determined by the asset metadata 215 and classification policy), some security incidents recorded for the server 140 may nevertheless not be prioritized. Conversely, for non-public facing server 150, some incidents that would be routine for a public facing system may be prioritized for review, e.g., a connection between server 150 and an external client.

Figure 4:
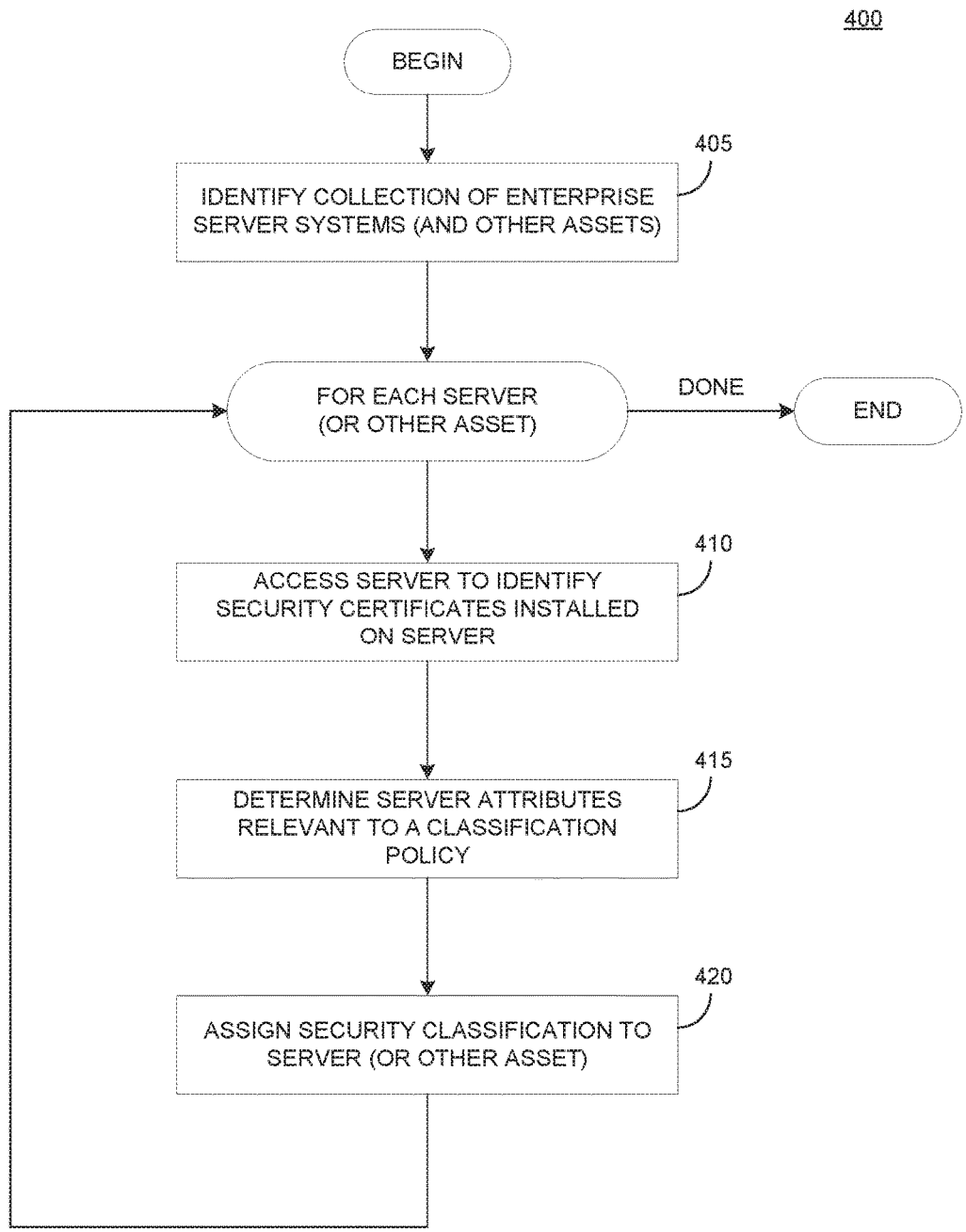
FIG. 4 illustrates a method for discovering and classifying enterprise assets via host characteristics, according to one embodiment.

Referring again to FIG. 3, the security and event database can record any behavior or state that may be detected or observed by the intrusion prevention system 305, firewall system 310 and antivirus system 315. Of course, one of ordinary skill in the art will recognize that other security monitoring systems may be used as well. Figure FIG. 4 illustrates a method 400 for discovering and classifying enterprise assets via host characteristics, according to one embodiment. As shown, the method 400 begins at step 405 wherein the asset discovery and classification system 170 identifies a collection of enterprise server systems (or other computing assets or resources). As noted, the classification system 170 may receive a list of network addresses or server names, or access a directory service to identify the collection of systems. However the collection of systems is identified, the classification system 170 may evaluate each such system individually at steps 410-420.

At step 410, the classification system 170 accesses a server to identify any digital certificates installed on that server. Once the digital certificates are identified, the classification system 170 may record a variety of certificate attributes, e.g., key size and supported encryption types, use flags, cost, issuing certificate authority, certificate and certification policies, etc. This classification system 170 stores the certificate properties as asset metadata. At step 415, the classification system 170 may determine other configuration attributes of a server relevant to a given classification policy. For example, the classification system 170 may determine what network addresses are configured on a server, whether such addresses are reachable from outside the enterprise network, what applications or operating systems are installed, what naming conventions are used for the hostname, applications, etc. Like the certificate properties, host information may be stored as asset metadata. At step 420, the classification system 170 may assign a security classification to the server 420, based on the asset metadata obtained at steps 410 and 415. As noted, the classification assigned at step 420 may be used to prioritize security incidents observed by systems monitoring that server within an enterprise network.

Figure 5:
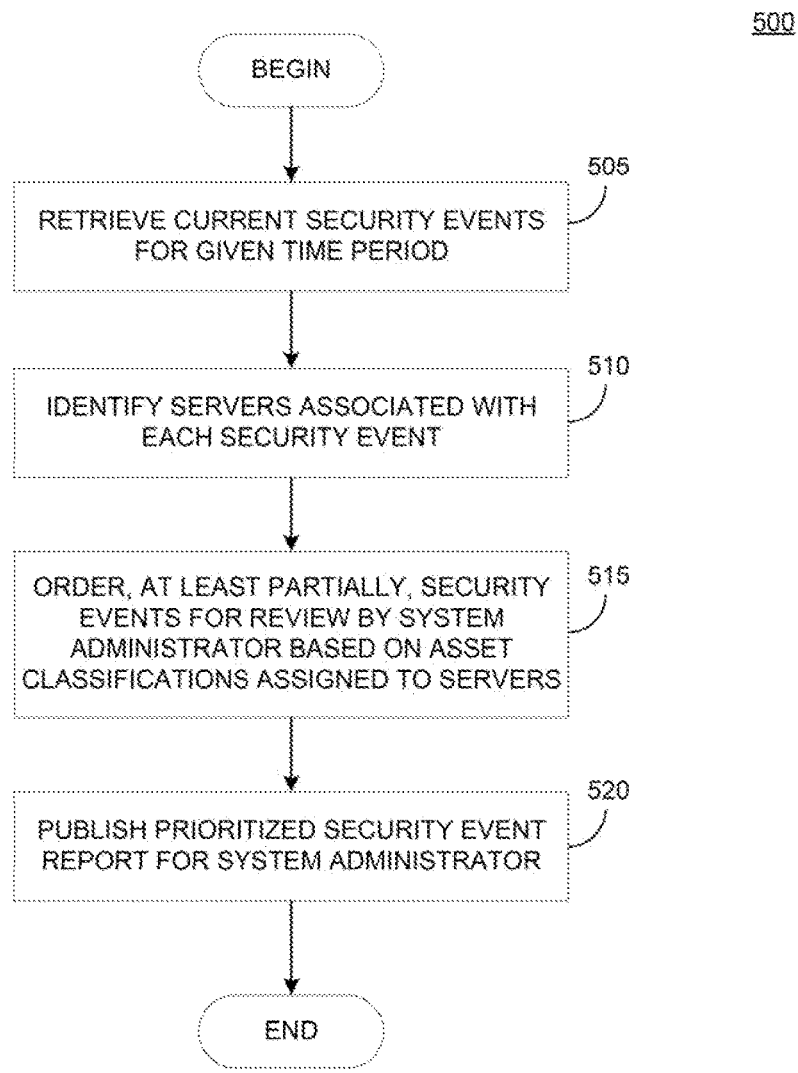
FIG. 5 illustrates a method for prioritizing security incidents based on asset classifications, according to one embodiment.

FIG. 5 illustrates a method 500 for prioritizing security incidents based on asset classifications, according to one embodiment. As shown, the method 500 begins at step 505, where the security monitoring systems 165 retrieve a collection of security events that have occurred over a given time period (or as requested by a system administrator). Similarly, the security events could be restricted to a given set of hosts, such as hosts having a given security classification assigned by the classification system 170. However the collection of security events is obtained, at step 510, the monitoring system 165 identifies the server (or other asset) associated with each security incident. And at step 515, the security monitoring systems 165 order the security incidents identified at step 505 based on the classifications assigned to the servers (or other assets).

Once security incidents are ordered, the security monitoring systems 165 publish the security incidents for review by a system administrator, as prioritized by the server classifications, at step 520. For example, FIG. 6 illustrates an example interface 600 showing a report which prioritizes security incidents based on asset classifications, according to one embodiment. A table 605 provides a ranking of eight security incidents. In this specific example, a "port scan" occurring on a server with a public IP address of 206.204.52.31 is listed. Column 610 of table 605 shows the classification of each server listed in table 605. As shown, the first four incidents are related to an "externally facing server" and a "high privacy endpoint." In this example, assume that both of these systems were classified as high-priority systems by the asset classification system. And as a result, the security incidents for these systems are presented first in the report. Conversely, a system with a low-priority—classified as an "internal development host"—has the last entry in the table 605. At the same time, another security incident observed on the "internal development host" is given a higher priority. In this specific example, a security monitoring system has observed a connection between the "internal development host" and a known location where malware applications are distributed. In this case, an important security event, even on a lower priority system, is given some priority in the ranking shown in FIG. 6. This illustrates how the prioritization can be at the host or server level (as shown for the "externally facing server" and "high-privacy end point", but also at the event level. Of course, one of ordinary skill in the art will recognize that table 605 merely illustrates an example of classifications, prioritization rules, and security incidents. And further, that the classifications, prioritization rules, and security incidents used in practice may be defined to suit the needs of a given enterprise network.

Figure 7:
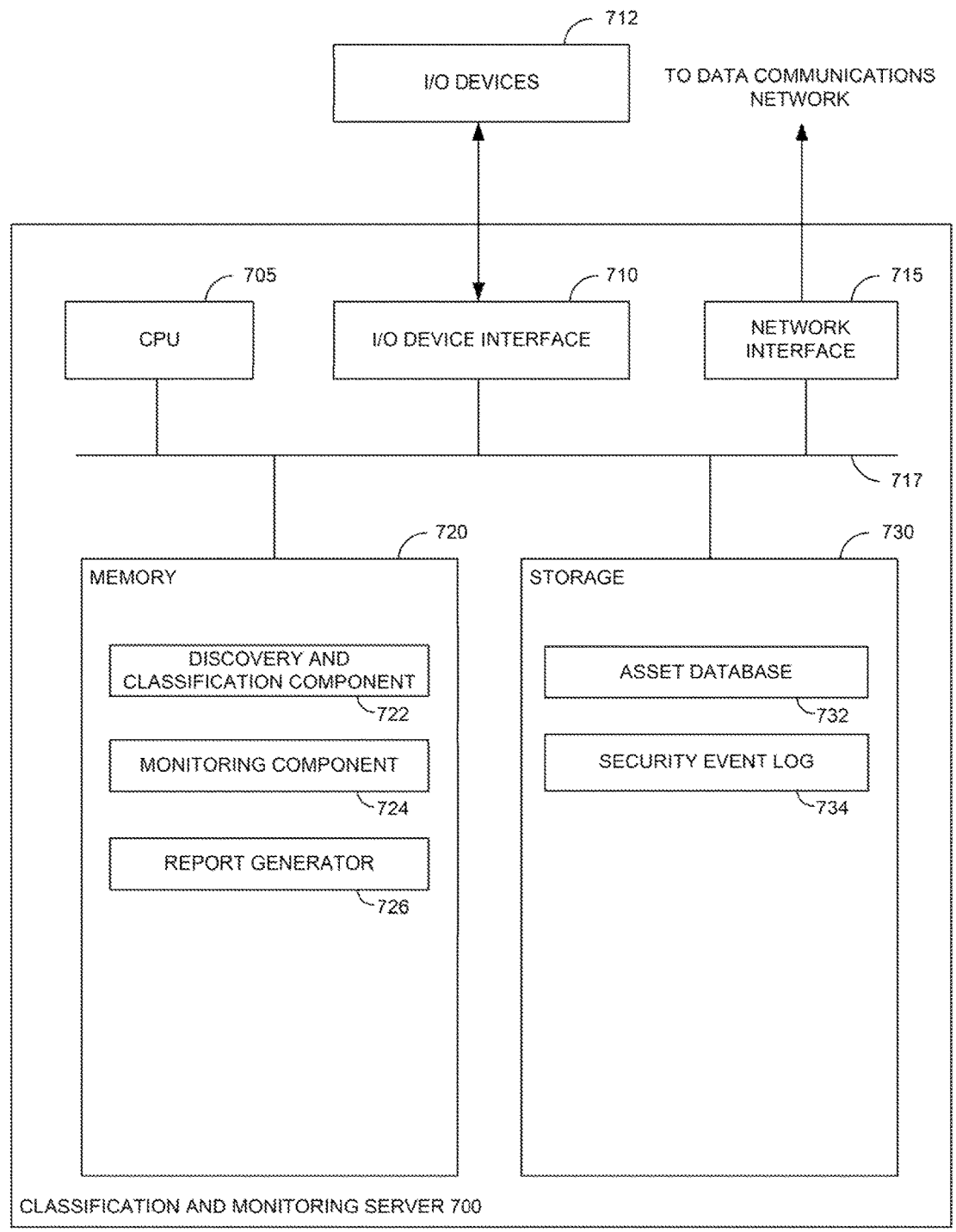
FIG. 7 illustrates an example computing system used to discover and classify assets security incidents, according to one embodiment.

FIG. 7 illustrates an example classification and monitoring server 700 used to discover and classify assets and to prioritize security incidents, according to one embodiment. As shown, the classification and monitoring server 700 includes, without limitation, a central processing unit (CPU) 705, a network interface 715, a network interface 715, a memory 720, and storage 730, each connected to a bus 717. The classification and monitoring server 700 may also include an I/O device interface 710 connecting I/O devices 712 (e.g., keyboard, display and mouse devices) to the classification and monitoring server 700. Further, in context of this disclosure, the computing elements shown in classification and monitoring server 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 730. The interconnect 717 is used to transmit programming instructions and application data between the CPU 705, I/O device interface 710, storage 730, network interface 715, and memory 720. Note, CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes a discovery and classification component 722, monitoring component 724, and report generator 726. And the storage 730 includes an asset database 732 and security event log 734. Note, for convenience, the system 700 is shown hosting both the discovery and classification component 722 and the monitoring component 724. Of course, one of ordinary skill in the art will recognize that in practice these components may be hosted on separate computing systems. As described above, the discovery and classification component 722 may provide one or more computing applications configured to identify any digital certificates provisioned on a collection of enterprise computing assets. The discovery and classification component 722 may also identify other attributes of the assets, such as whether a public IP address has been assigned to a given server system. Based on the security certificates and other attributes, the discovery and classification component 722 assigns a classification that may be used to prioritize security incidents recorded in the security event log 734. For example, the report generator 726 may be configured to retrieve a collection of security incidents for a report, where the report prioritizes the events based on the classifications assigned to a collection of enterprise servers.

Thus, as described, embodiments presented herein may be used to classify a variety of enterprise computing resources based on host application characteristics. In particular, a computing asset, e.g., a server, may be classified based on any digital certificates provisioned on that server. Once computing assets are classified, a monitoring system may prioritize security incidents for review based on the assigned classifications. The properties of a digital certificate may be used to determine a measure of business value or importance of a server (or data hosted on that server). Certificates with more advanced cipher algorithms and higher costs generally indicate a stronger need to protect that asset. Using digital certificates to help determine asset value allows an enterprise to prioritize security incidents without the need for manual asset classification.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, an asset discovery and classification component could access virtual machines executing in computing cloud to identify what digital certificates have been provisioned on those machine. Similarly, the asset discovery and classification component could be hosted from a cloud based location. Doing so could allow the classification component to access systems in multiple data centers. Further, the monitoring component could be configured to observe and prioritize security incidents for multiple machines from a cloud based host.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing a plurality of computing assets, the method comprising:
   identifying a plurality of computing assets of an enterprise network from a list of network addresses associated with each respective computing asset by probing each network address for digital certificate information presented by the respective computing asset in response to the probing;
   for at least a first computing asset of the one or more of the computing assets:
      identifying, by operation of at least one computer processor, one or more attributes associated with a digital certificate installed on the first computing asset,
      identifying one or more configuration attributes of the first computing asset, wherein the one or more configuration attributes include a plurality of network addresses configured on the first computing asset, an indication of whether the plurality of network addresses are reachable outside of the enterprise network, an indication of applications and operating systems installed on the first computing asset, and naming conventions associated with the first asset, and
      assigning a classification to the first computing asset based on the attributes of the identified digital certificate and based on the configuration attributes of the computing asset, wherein the classification is used to prioritize security incidents occurring on the plurality of computing assets;
   receiving one or more security incidents for a set of the one or more computing assets, wherein the set is restricted to a first assigned classification of the one or more computing assets, and wherein the one or more security incidents occurred over a specified time period; and
   prioritizing the one or more security incidents based on the first assigned classification and an underlying event associated with each of the one or more security incidents.

2. The computer-implemented method of claim 1, wherein the configuration attributes include a network configuration of the computing asset.

3. The computer-implemented method of claim 1, wherein the attributes associated with the digital certificate include at least one of a key size, a supported encryption algorithm, an issuing certificate authority, and use flags specified in the digital certificate.

4. The computer-implemented method of claim 1, wherein the computing asset comprises a computing server hosting one or more applications.

5. The computer-implemented method of claim 1, wherein the security incidents are recorded in an event database by one or more systems configured to monitor the plurality of computing assets.

6. A non-transitory computer-readable storage medium storing instructions, which, when executed on a processor, performs an operation for managing a plurality of computing assets, the operation comprising:

identifying a plurality of computing assets of an enterprise network from a list of network addresses associated with each respective computing asset by probing each network address for digital certificate information presented by the respective computing asset in response to the probing;

for at least a first computing asset of the one or more of the computing assets:

identifying, by operation of at least one computer processor, one or more attributes associated with a digital certificate installed on the first computing asset, identifying one or more configuration attributes of the first computing asset, wherein the one or more configuration attributes include a plurality of network addresses configured on the first computing asset, an indication of whether the plurality of network addresses are reachable outside of the enterprise network, an indication of applications and operating systems installed on the first computing asset, and naming conventions associated with the first asset, and assigning a classification to the first computing asset based on the attributes of the identified digital certificate and based on the configuration attributes of the computing asset, wherein the classification is used to prioritize security incidents occurring on the plurality of computing assets;

receiving one or more security incidents for a set of the one or more computing assets, wherein the set is restricted to a first assigned classification of the one or more computing assets, and wherein the one or more security incidents occurred over a specified time period; and prioritizing the one or more security incidents based on the first assigned classification and an underlying event associated with each of the one or more security incidents.

7. The non-transitory computer-readable storage medium of claim 6, wherein the configuration attributes include a network configuration of the computing asset.

8. The non-transitory computer-readable storage medium of claim 6, wherein the attributes associated with the digital certificate include at least one of a key size, a supported encryption algorithm, an issuing certificate authority, and use flags specified in the digital certificate.

9. The non-transitory computer-readable storage medium of claim 6, wherein the computing asset comprises a computing server hosting one or more applications.

10. The non-transitory computer-readable storage medium of claim 6, wherein the security incidents are recorded in an event database by one or more systems configured to monitor the plurality of computing assets.

11. A system, comprising:
a processor; and
a memory hosting an application, which, when executed on the processor, performs an operation for an operation for managing a plurality of computing assets, the operation comprising:

identifying a plurality of computing assets of an enterprise network from a list of network addresses associated with each respective computing asset by probing each network address for digital certificate information presented by the respective computing asset in response to the probing, for at least a first computing asset of the one or more of the computing assets:

identifying, by operation of at least one computer processor, one or more attributes associated with a digital certificate installed on the first computing asset, identifying one or more configuration attributes of the first computing asset, wherein the one or more configuration attributes include a plurality of network addresses configured on the first computing asset, an indication of whether the plurality of network addresses are reachable outside of the enterprise network, an indication of applications and operating systems installed on the first computing asset, and naming conventions associated with the first asset, and assigning a classification to the first computing asset based on the attributes of the identified digital certificate and based on the configuration attributes of the computing asset, wherein the classification is used to prioritize security incidents occurring on the plurality of computing assets, receiving one or more security incidents for a set of the one or more computing assets, wherein the set is restricted to a first assigned classification of the one or more computing assets, and wherein the one or more security incidents occurred over a specified time period, and prioritizing the one or more security incidents based on the first assigned classification and an underlying event associated with each of the one or more security incidents.

12. The system of claim 11, wherein the configuration attributes include a network configuration of the computing asset.

13. The system of claim 11, wherein the attributes associated with the digital certificate include at least one of a key size, a supported encryption algorithm, an issuing certificate authority, and use flags specified in the digital certificate.

14. The system of claim 11, wherein the computing asset comprises a computing server hosting one or more applications.

* * * * *